Apr. 3, 1923.                                            1,450,745
L. L. LEECE
GEAR SHIFT FOR MOTOR VEHICLES
Filed Apr. 6, 1921
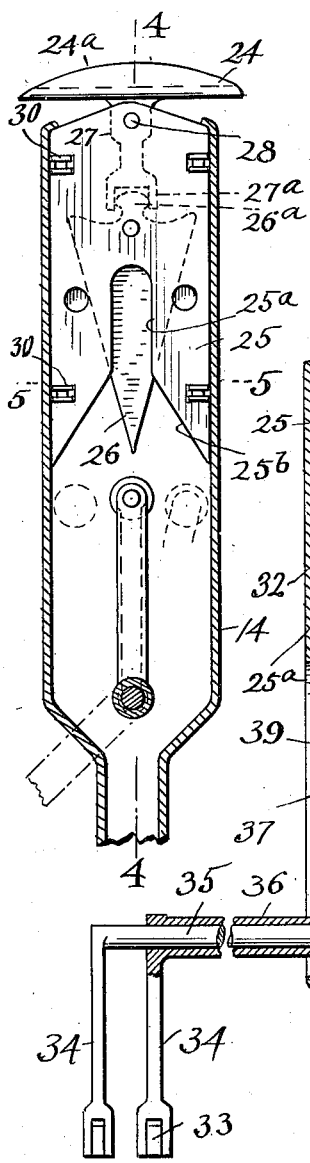
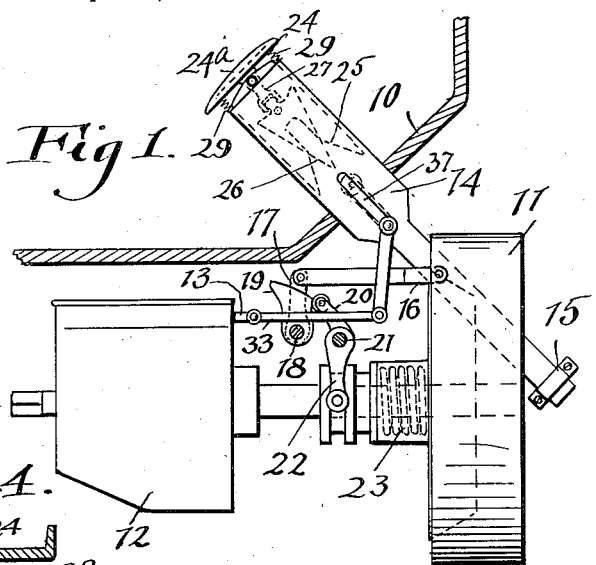
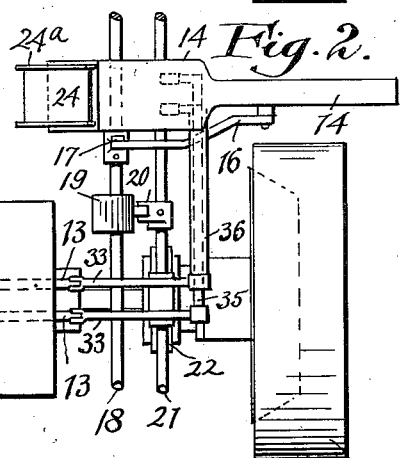
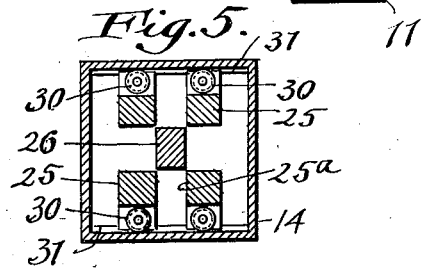
Inventor:
Leicester L. Leece.
Thurston Rion & Hudson
attys Patented Apr. 3, 1923.

1,450,745

UNITED STATES PATENT OFFICE.

LEICESTER L. LEECE, OF CLEVELAND, OHIO.

GEAR SHIFT FOR MOTOR VEHICLES.

Application filed April 6, 1921. Serial No. 459,018.

*To all whom it may concern:*

Be it known that I, LEICESTER L. LEECE, a citizen of the United States, residing at Cleveland, in the county of Cuyahoga and State of Ohio, have invented a certain new and useful Improvement in Gear Shift for Motor Vehicles, of which the following is a full, clear, and exact description.

This invention relates to a gear shift for motor vehicles, and has for its chief object to do away with the necessity for two separate controlling members for the clutch and gears, and to provide a single actuating member which with a movement similar to that given to the ordinary clutch or brake pedal, throws out the clutch and selectively shifts the gears, after the foot engaging part of the device is given certain preliminary movements depending upon whether the drive is to be forward or reverse, and the particular speed selected.

More specifically considered, my improved clutch and gear control is designed to be employed with the ordinary type of clutch, and with the usual speed change or sliding gear transmission, and contemplates a clutch shifting member carrying a foot pedal mounted for tilting and slight lateral sliding movements, the whole being so arranged that when the pedal is first shifted to proper position and then with the clutch controlling member is pushed downward with the usual clutch shifting motion, simultaneously one gear shifting rod is returned to neutral position and the other is shifted forwardly or backward so as to make the right speed change.

The invention may be further briefly summarized as consisting in certain novel details of construction, and combinations and arrangements of parts which will be described in the specification and set forth in the appended claims.

In the accompanying sheet of drawings, Fig. 1 is a side view of my improved mechanism showing the gear case and combined fly-wheel and clutch of an internal combustion engine as utilized on a motor vehicle; Fig. 2 is a top plan view of the same, omitting some of the motor vehicle body parts shown in Fig. 1; Fig. 3 is an enlarged longitudinal sectional view, with the lower part omitted, of the clutch and gear controlling member; Fig. 4 is a sectional view substantially along the line 4—4 of Fig. 3; and Fig. 5 is a transverse sectional view substantially along the line 5—5 of Fig. 1 looking downward.

Referring now to the drawings, 10 represents the usual foot board in the body of the motor vehicle, 11 the combined fly-wheel and clutch of the internal combustion engine, and 12 the case for the transmission or speed change gears. I have not attempted to show the gears themselves, as the usual sliding gear transmission is contemplated, the gears being selectively shifted by a pair of horizontal forwardly and rearwardly movable shifter rods 13, customarily employed.

My improved clutch control and gear shifter includes a diagonally disposed, endwise movable hollow member 14, slidingly mounted in the foot board 10, and having a reduced lower end loosely engaged by a guide 15. The lower part of the member 14 is connected by a link 16, which extends rearwardly to and is pivotally connected with an arm 17 on a suitably supported shaft 18 carrying a clutch controlling cam 19 adapted to be engaged by a roller of an arm 20 mounted on a second suitably supported shaft 21 carrying a yoke 22 for throwing out the clutch. From the parts so far described, it will be apparent that when the controlling member 14 is pressed downward, the edge of the cam by its engagement with the roller carried by the arm 20 throws the clutch out, and when the member 14 is released it will be moved upwardly by the action of the spring 23 of the clutch when the spring throws in the clutch. The cam 19 is so designed that when the member 14 is depressed, the latter will in the early part of its movement throw out the clutch, after which further downward movement of the member 14 is permitted.

At the top of the member 14 is a clutch pedal 24 adapted to be engaged by the foot of the operator, this pedal having flanged sides 24ᵃ. Inside the member 14 and movable therein are three parallel gear shifting members including two outer members 25 and an inner member 26. The pedal 24 has an arm 27, extending down between the two members 25, and is pivotally connected to them by a pin 28. A pair of springs such as shown at 29 in Fig. 1 may be utilized to hold the pedal in the central position with reference to the members 25 which support it. The lower part of the arm 27 of the pedal is forked, as shown at 27ᵃ, and fits somewhat loosely over a projection 26ª at the top of the inner shifter member 26. This member 26 is pivoted to the two outer shifter members 25 by means of a transverse pin 29. It will be obvious that when the pedal is rocked or tilted the inner member will likewise be rocked or tilted about the pin 29. The inner member 26 is wedge-shaped, as clearly shown in Fig. 3, the point of the wedge being at its lower end. On the other hand, each of the two shifter members 25 are provided with longitudinally extending slots 25ª, which opposite the lower part of the wedge-shaped member 26 are flared outwardly as shown at 25ᵇ.

The pedal 24 and the three shifter members 25, 25 and 26 are in the form of a unit designed to be moved laterally in the hollow member 14, and while this unit could be mounted for lateral movement in the member 14 in various ways, I have in this instance shown the two outer members 25 provided with upper and lower flanged rollers 30, which in this instance travel over guide rails 31 (see Figs. 3 and 4) on the front and rear walls of the hollow member 14. Springs 32 between the sides of the hollow member 14 and the two outer shifter members 25 serve to normally position the unit centrally in the hollow member 14, and restore it to central position when released after being moved laterally.

From the mechanism so far described, it will be observed that the operator may tilt the pedal 24, and thus throw the point of wedge 26 forwardly or rearwardly from the mid position shown in Fig. 3, and that by the mounting of the shifter unit in the hollow member 14 the operator can move the shifter unit (composed of the parts 24, 25, 25 and 26) to the right or left of the mid position. It will be understood that the tilting of the pedal 24 is accomplished by the operator by simply rocking his foot on the pedal, and that the shifting of the unit laterally is brought about by the lateral shifting of his foot when engaging the side flanges 24ª of the pedal. The tilting of the pedal and the lateral shifting of the unit can take place simultaneously or successively.

Referring now to the gear shifter rods 13, referred to in the early part of this description, it will be observed that the forward ends of these rods are connected by links 33 (see Figs. 1 and 2) to the lower ends of a pair of arms 34 (see particularly Fig. 4) which arms are arranged side by side, and respectively extend downwardly from a shaft 35 and a sleeve 36, the shaft being rotatively supported in the sleeve, and the latter being supported in any suitable manner so that both parts may rotate about a fixed axis. The shaft 35 and surrounding sleeve 36 extend through a slot 37 in the hollow member 14, and inside the latter the sleeve and shaft have upstanding arms 38 adapted to be rocked in parallel planes, and provided at their upper ends with rollers 39, the distance between which is substantially equal to but slightly greater than the thickness of the middle shifter member 26, as shown in Fig. 4. When the shifter rods 13 are in neutral position, the arms 38 extend side by side centrally of the hollow member 14, as shown in Fig. 3, with the rollers 39 a short distance beneath and on opposite sides (laterally considered) of the point of the wedge 26, and directly in line with the slots 25ª of the shifter members 25.

The device above described, operates in the following manner: To bring about a certain selected shift of the gears, the operator will rock the pedal 24 which swings the point of the wedge 26 to the right, or the left, as the case may be, i. e. so that it will be in front or at the rear of the roller 39 to be shifted, and then shifts the unit to the right or left, depending upon which roller 39 is to be engaged by the wedge. This lateral shifting brings the wedge into the plane of the roller to be moved. The operator will then depress the controlling device by moving downwardly and forwardly with his foot, and in so doing the wedge 26 shifts the appropriate roller 39 and rocks the appropriate arm 38 so as to effect the shift desired. At the same time, the other roller 39 on the companion arm 38 is restored to neutral position by one of the shifter members 25. That is to say, if the unit is moved to the left as viewed in Fig. 4, the wedge 26 is brought in position to shift the left hand roller 39 and to rock the left hand arm 38 in either direction, depending upon the direction in which the pedal 24 was previously rocked, and the right hand shifter member 25 is still in the plane of the opposite roller 39 so that as the unit is depressed, due to the lower flared portion of the slot 25ª of the shifter 25 last referred to, the right hand roller 39 and its arm 38 are restored to neutral position, causing the shifter rod 13 connected thereto to be brought to neutral position. On the release of the pedal the controlling member moves upwardly, the clutch being thus automatically thrown in, and the shifting unit in the member 14 automatically coming to neutral position. On the next shift the same operations are repeated, one shifter rod being always restored to neutral position if previously out of neutral position, at the same time that the other is moved forwardly or rearwardly as the selected shift requires.

Thus by slight preliminary movements of the foot and a downward movement such as the driver of an automobile is accustomed to, the clutch is controlled, and many of the four usual gear shifts consisting of reverse, and forward to low, intermediate or high positions is effected. The various movements can be quickly and conveniently imparted to the mechanism, and as the control of the clutch and the shifting of the gears is effected through what is in effect a foot actuated instrumentality (the single clutch pedal 24) the usual controlling mechanism has been materially simplified.

While I have shown one embodiment of my invention, I do not desire to be confined to the exact details as the parts may be differently mounted and arranged, and I therefore aim in my claims to cover all modifications which do not involve a departure from the spirit and scope of the invention as set forth in the appended claims.

Having described my invention, I claim:

1. In a foot controlled gear shift for motor vehicles, a pair of gear shifting members movable to and from neutral position, a pedal, and selective means operated by the pedal and serving when the pedal is actuated in a certain direction to move either of the shifting members to a position to effect a selected shift and to move the other to neutral position.

2. In a foot controlled gear shift for motor vehicles, a pair of gear shifting members movable to and from neutral position, a pedal, and selected means operated by the pedal and serving when the pedal is actuated to move one of the shifting members to a position to effect a selected shift and to move the other to neutral position, and a clutch controlling member adapted to be actuated with the pedal.

3. In a foot controlled gear shift for motor vehicles, a pair of gear shifting members movable to and from neutral position, and a pedal with means associated therewith and serving when the pedal is actuated to move one of the shifting members to a position to effect a selected shift and to move the other to neutral position, said pedal having a movable support with reference to which the pedal and said associated means are movable.

4. In a foot controlled gear shift for motor vehicles, a movable clutch controlling member, a foot pedal carried thereby, a pair of gear shifters, and devices connected to said pedal and arranged to move either shifter to a position for a selected shift, and to move the other shifter to neutral position.

5. In a foot controlled gear shift for motor vehicles, a movable clutch controlling member, a foot pedal carried thereby, a pair of gear shifters, and devices connected to said pedal and arranged to move either shifter to a position for a selected shift, and to move the other shifter to neutral position, said pedal and said devices connected thereto being movable to predetermined positions on the clutch controlling members.

6. In a foot controlled gear shift for motor vehicles, a pair of gear shifting members movable to and from neutral position, a foot pedal, devices connected to the pedal for moving either of said shifters to a position for a selected shift, and the other to neutral position, said pedal and the associated devices having a selecting movement in one direction and a shifter actuating movement in another direction.

7. In a foot control for motor vehicles, a movable clutch controlling member, a foot pedal carried thereby, and tiltable and laterally movable with reference thereto, a pair of gear shifters movable in either direction to and from neutral position, and means operatively associated with the pedal for selectively shifting said gear shifters, one to a predetermined position from neutral position, and the other back to neutral position.

In testimony whereof, I hereunto affix my signature.

LEICESTER L. LEECE.